(12) United States Patent
O'Donnell et al.

(10) Patent No.: US 9,897,394 B2
(45) Date of Patent: Feb. 20, 2018

(54) SUBSURFACE THERMAL ENERGY STORAGE OF HEAT GENERATED BY CONCENTRATING SOLAR POWER

(71) Applicants: GLASSPOINT SOLAR, INC., Fremont, CA (US); THE BOARD OF TRUSTEES OF THE LELAND STANFORD JUNIOR UNIVERSITY, Palo Alto, CA (US)

(72) Inventors: John Setel O'Donnell, Palo Alto, CA (US); Anthony Robert Kovscek, San Carlos, CA (US)

(73) Assignee: GlassPoint Solar, Inc., Fremont, CA (US)

( * ) Notice: Subject to any disclaimer, the term of this patent is extended or adjusted under 35 U.S.C. 154(b) by 0 days.

(21) Appl. No.: 15/063,359

(22) Filed: Mar. 7, 2016

(65) Prior Publication Data
US 2017/0038157 A1 Feb. 9, 2017

Related U.S. Application Data

(63) Continuation of application No. 13/730,249, filed on Dec. 28, 2012, now Pat. No. 9,291,367, which is a
(Continued)

(51) Int. Cl.
*F24J 2/42* (2006.01)
*F28D 20/02* (2006.01)
(Continued)

(52) U.S. Cl.
CPC .......... *F28D 20/0052* (2013.01); *E21B 43/24* (2013.01); *F01K 1/12* (2013.01);
(Continued)

(58) Field of Classification Search
CPC ........ F24J 2/34; F24J 2/42; F01K 1/12; F01K 1/02; F01K 1/14; F01K 3/12; E21B 43/24;
(Continued)

(56) References Cited

U.S. PATENT DOCUMENTS 1,240,890 A 9/1917 Shuman et al.
2,859,745 A 11/1958 Von Brudersdorff
(Continued)

FOREIGN PATENT DOCUMENTS

CN 201359397 Y 12/2009
DE 102004013590 A1 10/2005
(Continued)

OTHER PUBLICATIONS

Adventures in Energy, "Extracting Oil and Natural Gas." 1 pages, accessed Oct. 7, 2013.
(Continued)

*Primary Examiner* — Gregory Huson
*Assistant Examiner* — Daniel E Namay
(74) *Attorney, Agent, or Firm* — Perkins Coie LLP

(57) ABSTRACT

Techniques for subsurface thermal energy storage of heat generated by concentrating solar power enable smoothing of available energy with respect to daily and/or seasonal variation. Solar thermal collectors produce saturated steam that is injected into a producing or wholly/partially depleted oil reservoir that operates as a heat storage reservoir. Some of the saturated steam generated by the collectors is optionally used to generate electricity. Heat is withdrawn from the reservoir as saturated steam and is used to operate an active thermal recovery project (such as a producing thermally enhanced oil reservoir) and/or to generate electricity. Withdrawn heat is optionally augmented by heat produced by firing natural gas. The reservoir is optionally one that has
(Continued)

been used for thermally enhanced oil recovery and thus is already warm, minimizing heat losses.

24 Claims, 1 Drawing Sheet

Related U.S. Application Data continuation of application No. PCT/US2011/042968, filed on Jul. 5, 2011.

(60) Provisional application No. 61/361,506, filed on Jul. 5, 2010.

(51) Int. Cl.
| | |
|---|---|
| E21B 43/24 | (2006.01) |
| F28D 20/00 | (2006.01) |
| F03G 6/06 | (2006.01) |
| F24J 2/34 | (2006.01) |
| F01K 1/12 | (2006.01) |
| F01K 3/12 | (2006.01) |
| F24J 2/32 | (2006.01) |
| F03G 6/04 | (2006.01) |
| F01K 1/04 | (2006.01) |
| F22B 1/00 | (2006.01) |

(52) U.S. Cl.
CPC ............ *F01K 3/12* (2013.01); *F03G 6/065* (2013.01); *F24J 2/34* (2013.01); *F24J 2/42* (2013.01); *F28D 20/00* (2013.01); *F28D 20/02* (2013.01); *F01K 1/04* (2013.01); *F22B 1/006* (2013.01); *F28D 2020/0047* (2013.01); *Y02E 10/46* (2013.01); *Y02E 60/142* (2013.01); *Y02E 70/30* (2013.01); *Y02P 80/154* (2015.11)

(58) Field of Classification Search
CPC ....... F28D 2020/0017; F28D 2020/006; F28D 20/00; Y02E 70/30; Y02E 60/14; Y02E 60/142; Y02E 60/146; Y02E 10/46; F24D 1/08; F02C 6/04; F02C 6/14; F02C 6/16; F03G 6/04; F03G 6/065; F22B 1/006
USPC .......................... 126/620, 609, 619
IPC ................ F28B 20/00,20/02; F01K 1/02, 3/12; F03G 6/04, 6/06; F24J 2/34, 2/42; E21B 43/24
See application file for complete search history.

(56) References Cited

U.S. PATENT DOCUMENTS

| | | | |
|---|---|---|---|
| 3,962,873 A | 6/1976 | Davis | |
| 3,994,341 A | 11/1976 | Anderson et al. | |
| 4,143,642 A | 3/1979 | Beaulieu | |
| 4,174,752 A | 11/1979 | Slater et al. | |
| 4,209,222 A | 6/1980 | Posnansky | |
| 4,230,095 A | 10/1980 | Winston | |
| 4,258,696 A | 3/1981 | Gopal | |
| 4,262,653 A | 4/1981 | Holland et al. | |
| 4,296,739 A | 10/1981 | Bolding | |
| 4,333,447 A | 6/1982 | Lemrow et al. | |
| 4,372,386 A * | 2/1983 | Rhoades | C09K 8/592 165/45 |
| 4,392,531 A | 7/1983 | Ippolito et al. | |
| 4,445,499 A | 5/1984 | Platell | |
| 4,452,229 A | 6/1984 | Powers et al. | |
| 4,513,733 A | 4/1985 | Braun | |
| 4,577,679 A | 3/1986 | Hibshman et al. | |
| 5,018,576 A | 5/1991 | Udell et al. | |
| 5,048,507 A | 9/1991 | Ridett et al. | |
| 5,058,675 A | 10/1991 | Travis | |
| 5,699,785 A | 12/1997 | Sparkman | |
| 5,941,238 A | 8/1999 | Tracy et al. | |
| 5,954,046 A | 9/1999 | Wegler et al. | |
| 6,220,339 B1 | 4/2001 | Krecke et al. | |
| 7,028,685 B1 | 4/2006 | Krecke | |
| 7,234,314 B1 | 6/2007 | Wiggs | |
| 7,337,843 B2 | 3/2008 | Mecham et al. | |
| 7,472,548 B2 | 1/2009 | Meksvanh et al. | |
| 7,992,553 B2 | 8/2011 | Le Lievre | |
| 8,701,773 B2 | 4/2014 | O'Donnell et al. | |
| 8,748,731 B2 | 6/2014 | MacGregor et al. | |
| 9,291,367 B2 | 3/2016 | O'Donnell | |
| 2002/0108745 A1 | 8/2002 | Kimura et al. | |
| 2003/0080604 A1 | 5/2003 | Vinegar et al. | |
| 2006/0048770 A1 | 3/2006 | Meksvanh et al. | |
| 2006/0124360 A1 | 6/2006 | Lee et al. | |
| 2007/0056726 A1 | 3/2007 | Shurtleff | |
| 2007/0209365 A1 | 9/2007 | Hamer et al. | |
| 2008/0066736 A1 | 3/2008 | Zhu | |
| 2009/0056699 A1 | 3/2009 | Mills et al. | |
| 2009/0056944 A1 | 3/2009 | Nitschke | |
| 2009/0199847 A1 | 8/2009 | Hawley et al. | |
| 2009/0294092 A1 | 12/2009 | Bahl et al. | |
| 2009/0320830 A1 | 12/2009 | Bennett et al. | |
| 2010/0000733 A1* | 1/2010 | Chiesa | H01L 35/30 166/272.6 |
| 2010/0175687 A1 | 7/2010 | Zillmer et al. | |
| 2011/0017274 A1 | 1/2011 | Huang et al. | |
| 2011/0203577 A1 | 8/2011 | Coduri et al. | |
| 2011/0277470 A1* | 11/2011 | Benyaminy | F03G 6/06 60/641.8 |
| 2012/0125611 A1 | 5/2012 | Ayirala et al. | |
| 2012/0138293 A1 | 6/2012 | Kaminsky et al. | |
| 2012/0138316 A1 | 6/2012 | Matzakos | |
| 2012/0152307 A1 | 6/2012 | MacGregor et al. | |
| 2012/0167873 A1 | 7/2012 | Venetos et al. | |
| 2012/0234311 A1 | 9/2012 | Johnson et al. | |
| 2012/0255309 A1 | 10/2012 | Venetos et al. | |
| 2012/0274069 A1 | 11/2012 | Venetos et al. | |
| 2014/0190469 A1 | 7/2014 | O'Donnell et al. | |
| 2014/0216717 A1 | 8/2014 | O'Donnell et al. | |
| 2014/0347757 A1 | 11/2014 | MacGregor et al. | |
| 2014/0352304 A1 | 12/2014 | Arias et al. | |
| 2015/0107246 A1 | 4/2015 | Bindingnavale | |
| 2015/0285490 A1 | 10/2015 | O'Donnell et al. | |
| 2016/0116188 A1 | 4/2016 | O'Donnell et al. | |

FOREIGN PATENT DOCUMENTS

| | | |
|---|---|---|
| JP | 2012106282 A | 6/2012 |
| WO | WO-2008131175 A1 | 10/2008 |
| WO | 2008153922 A1 | 12/2008 |
| WO | 2009105643 A2 | 8/2009 |
| WO | 2010040957 A1 | 4/2010 |
| WO | 2011053863 A2 | 5/2011 |
| WO | 2012006255 A2 | 1/2012 |
| WO | 2012006257 A2 | 1/2012 |
| WO | 2012006258 A2 | 1/2012 |
| WO | WO-2012107478 A1 | 8/2012 |
| WO | 2012128877 A2 | 9/2012 |

OTHER PUBLICATIONS

Adventures in Energy, "Separating Oil, Natural Gas and Water." 1 page, accessed Oct. 7, 2013.
Bierman et al "Performance of Enclosed Trough OTSG for Enhanced Oil Recovery," SolarPaces 2013, pp. 11.
Bierman et al "Solar Enhanced Oil Recovery Plant in South Oman," SolarPaces 2013; pp. 10.
BrightSource Limitless, "Coalinga Project Facts, A BrightSource Energy Concentrating Solar Power Project," Fact Sheet, accessed Sep. 19, 2013, http://www.brightsourceenergy.com/stuff/contentmgr/files/0/ad5d33a2bc493a5079b5dda609724238/folder/coalinga_.

(56) References Cited

OTHER PUBLICATIONS

BrightSource Limitless, "Enhanced Oil Recovery Project—Coalinga," accessed Sep. 19, 2013, http://www.brightsourceenergy.com/coalinga, 2 pages.
Champion Technologies, "Enhanced Oil Recovery." 2 pages, accessed Oct. 7, 2013.
International Preliminary Report on Patentability and Written Opinion of International Application No. PCT/US2011/042698 mailed Jan. 17, 2013, 6 pages.
International Search Report issued in PCT/US2011/042968 completed on Mar. 9, 2012 (3 pages).
PROZ, 'on the edge of manufacturing tolerance' [bulletin board], Mar. 12, 2005 [retrieved on Jan. 7, 2014]. Retrieved from the Internet <http://www.proz.com/kudoz/English/military_defense/968330-on_the_edge_of_manufacturing_tolerance.html>.
The Linde Group, "Enhanced Oil Recovery (EOR)", 1 page, accessed Oct. 7, 2013.
Gomez, Judith C., "High-Temperature Phase Change Materials (PCM) Candidates for Thermal Energy Storage (TES) Applications," National Renewable Energy Laboratory, 36 pages.

\* cited by examiner

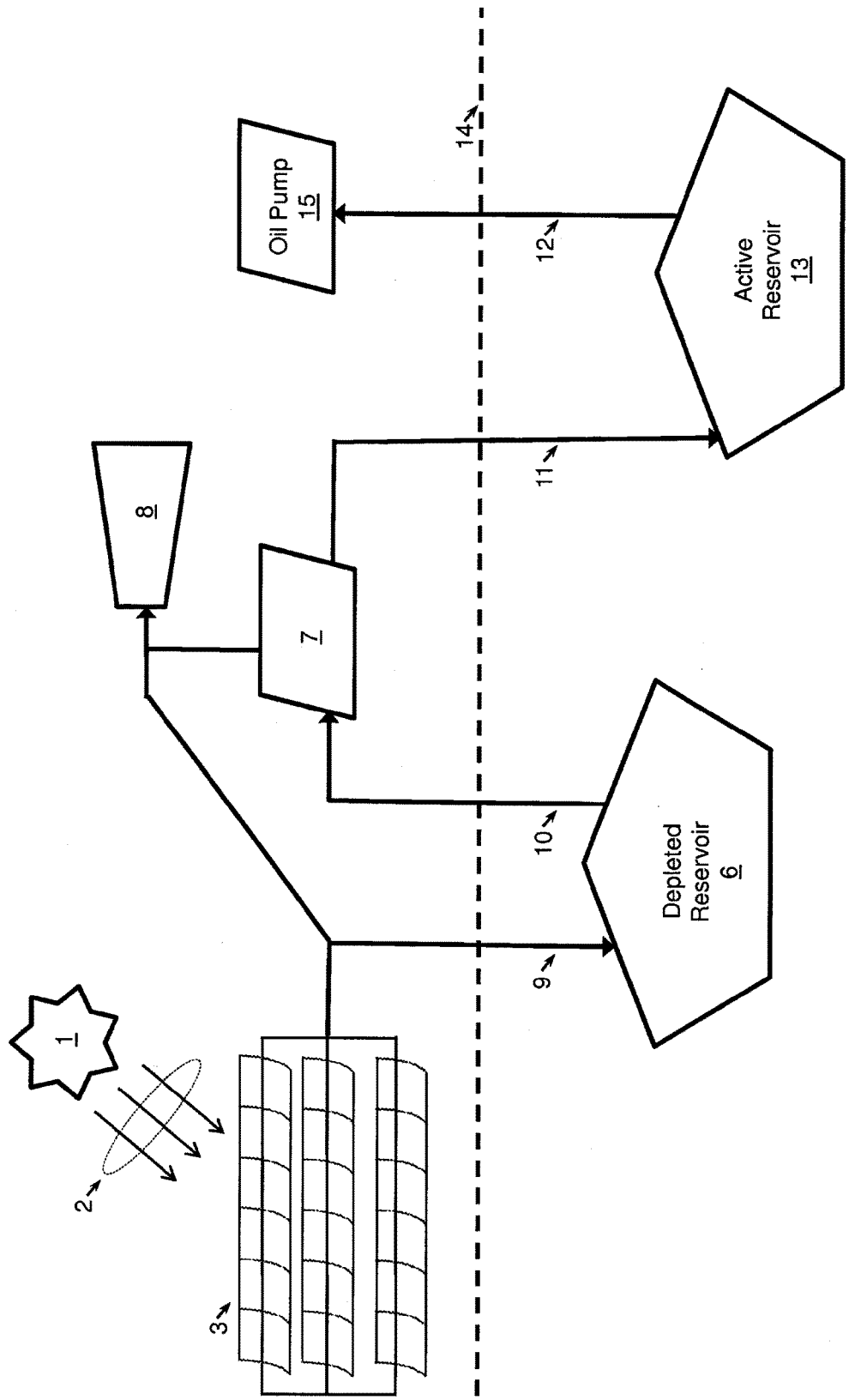

SUBSURFACE THERMAL ENERGY STORAGE OF HEAT GENERATED BY CONCENTRATING SOLAR POWER

CROSS REFERENCE TO RELATED APPLICATIONS

Priority benefit claims for this application are made in the accompanying Application Data Sheet, Request, or Transmittal (as appropriate, if any). To the extent permitted by the type of the instant application, this application incorporates by reference for all purposes the following applications, all commonly owned with the instant application at the time the invention was made:

U.S. Provisional Application Ser. No. 61/149,292, filed Feb. 2, 2009, first named inventor Rod MacGregor, and entitled Concentrating Solar Power with Glasshouses;

U.S. Provisional Application Ser. No. 61/176,041, filed May 6, 2009, first named inventor Peter Von Behrens, and entitled Concentrating PhotoVoltaics with Glasshouses;

PCT Application Serial No. PCT/US10/22780, filed Feb. 1, 2010, first named inventor Roderick MacGregor, and entitled Concentrating Solar Power with Glasshouses;

U.S. Provisional Application Ser. No. 61/361,509, filed Jul. 5, 2010, first named inventor Peter Von Behrens, and entitled Concentrating Solar Power with Glasshouses;

U.S. Provisional Application Ser. No. 61/361,512, filed Jul. 5, 2010, first named inventor John Setel O'Donnell, and entitled Direct Solar Oilfield Steam Generation;

U.S. Provisional Application Ser. No. 61/445,545, filed Feb. 23, 2011, first named inventor John Setel O'Donnell, and entitled Direct Solar Oilfield Steam Generation;

U.S. Provisional Application Ser. No. 61/361,506, filed Jul. 5, 2010, first named inventor Anthony Robert Kovscek, and entitled Subsurface Thermal Energy Storage of Heat Generated by Concentrating Solar Power;

PCT Application Serial No. PCT/US11/42891, filed Jul. 2, 2011, first named inventor Peter Von Behrens, and entitled Concentrating Solar Power with Glasshouses; and PCT Application Serial No. PCT/US11/42906, filed Jul. 3, 2011, first named inventor John Setel O'Donnell, and entitled Direct Solar Oilfield Steam Generation.

BACKGROUND

Field

Advancements in energy storage of heat generated by concentrating/collecting solar power are needed to provide improvements in performance, efficiency, and utility of use.

Related Art

Unless expressly identified as being publicly or well known, mention herein of techniques and concepts, including for context, definitions, or comparison purposes, should not be construed as an admission that such techniques and concepts are previously publicly known or otherwise part of the prior art. All references cited herein (if any), including patents, patent applications, and publications, are hereby incorporated by reference in their entireties, whether specifically incorporated or not, for all purposes.

Synopsis

The invention may be implemented in numerous ways, including as a process, an article of manufacture, an apparatus, a system, and a composition of matter. In this specification, these implementations, or any other form that the invention may take, may be referred to as techniques. The Detailed Description provides an exposition of one or more embodiments of the invention that enable improvements in performance, efficiency, and utility of use in the field identified above. The Detailed Description includes an Introduction to facilitate the more rapid understanding of the remainder of the Detailed Description. As is discussed in more detail in the Conclusions, the invention encompasses all possible modifications and variations within the scope of the issued claims.

BRIEF DESCRIPTION OF DRAWINGS

FIG. 1 illustrates an overview of an embodiment of a subsurface storage system for thermal energy.

DETAILED DESCRIPTION

A detailed description of one or more embodiments of the invention is provided below along with accompanying figures illustrating selected details of the invention. The invention is described in connection with the embodiments. The embodiments herein are understood to be merely exemplary, the invention is expressly not limited to or by any or all of the embodiments herein, and the invention encompasses numerous alternatives, modifications, and equivalents. To avoid monotony in the exposition, a variety of word labels (including but not limited to: first, last, certain, various, further, other, particular, select, some, and notable) may be applied to separate sets of embodiments; as used herein such labels are expressly not meant to convey quality, or any form of preference or prejudice, but merely to conveniently distinguish among the separate sets. The order of some operations of disclosed processes is alterable within the scope of the invention. Wherever multiple embodiments serve to describe variations in process, method, and/or features, other embodiments are contemplated that in accordance with a predetermined or a dynamically determined criterion perform static and/or dynamic selection of one of a plurality of modes of operation corresponding respectively to a plurality of the multiple embodiments. Numerous specific details are set forth in the following description to provide a thorough understanding of the invention. The details are provided for the purpose of example and the invention may be practiced according to the claims without some or all of the details. For the purpose of clarity, technical material that is known in the technical fields related to the invention has not been described in detail so that the invention is not unnecessarily obscured.

Introduction

This introduction is included only to facilitate the more rapid understanding of the Detailed Description; the invention is not limited to the concepts presented in the introduction (including explicit examples, if any), as the paragraphs of any introduction are necessarily an abridged view of the entire subject and are not meant to be an exhaustive or restrictive description. For example, the introduction that follows provides overview information limited by space and organization to only certain embodiments. There are many other embodiments, including those to which claims will ultimately be drawn, discussed throughout the balance of the specification.

Subsurface thermal energy storage of heat energy generated by concentrating and/or collecting solar power uses subsurface pore volume in producing, depleting, or depleted oil fields for large volume storage of heat generated by concentrating solar collectors. Fluid for transfer of heat energy from the surface to an underground storage volume (such as a depleted oil field) is saturated steam. Heat energy is injected or removed from a reservoir using wells. Injection and production wells, a reservoir, and any ancillary equipment for heat transfer are referred to as the energy storage system.

In some embodiments and/or usage scenarios, a subsurface storage system replaces, or greatly reduces, a size of an above ground thermal storage (such as implemented with insulated tanks using molten salts as an energy storage medium).

Subsurface Thermal Energy Storage of Heat Generated by Concentrating and/or Collecting Solar Power Concentrating and/or collecting solar power produces ample amounts of thermal energy but is intermittent throughout the course of a 24-hour day as well as a year. An effective thermal energy system would provide energy storage for daily as well as seasonal usage. Various embodiments of subsurface storage systems are characterized by one or more of: providing short and/or long term storage, not using heat transfer fluids engineered for purpose in each particular storage system, permitting a heat transfer fluid to flow from a reservoir to the surface with minimal load (e.g., without introduction of a parasitic load), and having minimal or reduced heat loss to surrounding subsurface strata (such as strata that are relatively cool).

Selection, design, execution, and management of a subsurface thermal energy storage system is based on saturated steam as a heat transfer fluid and is further based on selection of large subsurface reservoirs where the reservoir thickness and volume minimize heat loss from the reservoir to surrounding subsurface strata. The design of solar collectors is generally independent of the subsurface thermal energy storage system. The system operates with current collectors such as parabolic troughs, compact linear Fresnel reflectors, power towers, and so on, and is envisioned to operate with future collectors also.

FIG. 1 illustrates an overview of an embodiment of a subsurface storage system for thermal energy. When illuminated by light 2 from sun 1, a battery of solar thermal collectors 3 produces (directly or indirectly) saturated steam at a suitable pressure for injection via steam distribution lines 9 into storage reservoir 6. There is no need for further pressurization. Storage reservoir 6 is a depleted oil reservoir that has been subjected to thermally enhanced oil recovery and so already has steam distribution lines 9 and wellhead 10 in place and is already warmed, thereby minimizing heating of cold formation and heat losses to overburden and underburden. Steam injection raises temperature and pressure of the storage reservoir. In various embodiments, storage of thermal energy smoothes daily variations of available energy, seasonal variations of available energy, or both. Relatively large amounts of thermal energy are storable in a storage reservoir, in some embodiments. In some usage scenarios, stored thermal energy enables continuous energy delivery, such as at a relatively constant rate, or at varying rates. In some usage scenarios, stored thermal energy enables intermittent or non-smooth energy delivery and/or withdrawal, for example in a context of time-of-day energy costs.

Heat is withdrawn from storage reservoir 6 as saturated steam by establishing a wellhead pressure that is suitable for steam to flow to the surface. Additional energy is enabled to be withdrawn by pumping fluid out of the reservoir using appropriate geothermal and oil field technology 7. Produced saturated steam is optionally injected directly into a producing thermally enhanced oil reservoir 13 through existing steam distribution lines 11 if the pressure and temperature of the steam enable the direct injection. Higher temperature and pressure steam (and/or backup generation of steam) are also enabled by using a natural gas fired boiler within oil field technology 7 to adjust steam conditions to meet specifications. Saturated steam produced by solar thermal collectors 3 and/or withdrawn from storage reservoir 6 is optionally used by industrial process 8, such as (i) to generate electricity that is then distributed for sale via an electrical power distribution grid or (ii) as process heat (for oil field separations, for example).

Reservoir minerals and other solids are appreciably soluble in hot water and, in some usage scenarios, deposit on wellbore equipment and tubulars as liquid moves up the wellbore and flashes to steam at lower pressure. Formation of scale on wellbore equipment is mitigated with chemical inhibitors applied to a production well as is done commonly in the geothermal energy industry.

Storage reservoir 6 and active reservoir 13 are below ground level geological 14 structures. Oil is extracted from active reservoir by standard enhanced oil recovery well head equipment 15 through well 12.

CONCLUSION

Certain choices have been made in the description merely for convenience in preparing the text and drawings and unless there is an indication to the contrary the choices should not be construed per se as conveying additional information regarding structure or operation of the embodiments described. Examples of the choices include: the particular organization or assignment of the designations used for the figure numbering and the particular organization or assignment of the element identifiers (the callouts or numerical designators, e.g.) used to identify and reference the features and elements of the embodiments.

The words "includes" or "including" are specifically intended to be construed as abstractions describing logical sets of open-ended scope and are not meant to convey physical containment unless explicitly followed by the word "within."

Although the foregoing embodiments have been described in some detail for purposes of clarity of description and understanding, the invention is not limited to the details provided. There are many embodiments of the invention. The disclosed embodiments are exemplary and not restrictive.

It will be understood that many variations in construction, arrangement, and use are possible, consistent with the description, and are within the scope of the claims of the issued patent. The names given to elements are merely exemplary, and should not be construed as limiting the concepts described. Also, unless specifically stated to the contrary, value ranges specified, maximum and minimum values used, or other particular specifications, are merely those of the described embodiments, are expected to track improvements and changes in implementation technology, and should not be construed as limitations.

Functionally equivalent techniques known in the art are employable instead of those described to implement various components, sub-systems, operations, functions, or portions thereof.

The embodiments have been described with detail and environmental context well beyond that required for a minimal implementation of many aspects of the embodiments described. Those of ordinary skill in the art will recognize that some embodiments omit disclosed components or features without altering the basic cooperation among the remaining elements. It is thus understood that much of the details disclosed are not required to implement various aspects of the embodiments described. To the extent that the remaining elements are distinguishable from the prior art, components and features that are omitted are not limiting on the concepts described herein.

All such variations in design are insubstantial changes over the teachings conveyed by the described embodiments. It is also understood that the embodiments described herein have broad applicability to other applications, and are not limited to the particular application or industry of the described embodiments. The invention is thus to be construed as including all possible modifications and variations encompassed within the scope of the claims of the issued patent.

What is claimed is:

1. A method for handling steam, comprising:
   directing a first quantity of saturated steam into a first underground volume;
   extracting heat from the first underground volume in the form of steam;
   adjusting a condition of the steam to form a second quantity of saturated steam; and
   directing the second quantity of saturated steam into a second underground volume.

2. The method of claim 1 wherein extracting heat from the first underground volume in the form of steam includes pumping the steam.

3. The method of claim 1 wherein at least one of extracting heat from the first underground volume in the form of steam and adjusting a condition of the steam to form a second quantity of saturated steam includes increasing a pressure of the steam.

4. The method of claim 1 wherein at least one of extracting heat from the first underground volume in the form of steam and adjusting a condition of the steam to form a second quantity of saturated steam includes using energy from solar thermal collectors.

5. The method of claim 4 wherein the energy is in the form of a third quantity of saturated steam.

6. The method of claim 1 wherein adjusting a condition of the steam includes increasing a temperature and pressure of the steam.

7. The method of claim 1 wherein adjusting a condition of the steam includes increasing at least one of a temperature or a pressure of the steam.

8. The method of claim 7 wherein increasing at least one of the temperature or the pressure of the steam includes heating the steam with a boiler.

9. The method of claim 7 wherein increasing at least one of the temperature or the pressure of the steam includes heating the steam with a natural gas fired boiler.

10. The method of claim 1 wherein the first underground volume is at least one of a producing oil field, a depleting oil field, or a depleted oil field.

11. The method of claim 1 wherein the second underground volume is a producing oil field.

12. The method of claim 1, further comprising heating the first quantity of saturated steam with concentrated solar energy.

13. A system for handling steam, comprising:
   a first underground volume coupled to a source of saturated steam to receive a first quantity of saturated steam;
   a wellhead coupled to the first underground volume to extract heat from the first underground volume in the form of steam;
   an oil field technology facility coupled to the wellhead and configured to adjust a condition of the steam to form a second quantity of saturated steam; and
   a stream distribution line coupled between the oil field technology facility and a second underground volume to direct the second quantity of saturated steam into the second underground volume.

14. The system of claim 13 wherein the oil field technology facility is configured to pump the steam.

15. The system of claim 13 wherein the oil field technology facility is configured to increase a pressure of the steam.

16. The system of claim 13 wherein the oil field technology facility is configured to use energy from solar thermal collectors.

17. The system of claim 16 wherein the energy is in the form of a third quantity of saturated steam.

18. The system of claim 13 wherein the condition of the steam includes a temperature and pressure of the steam.

19. The system of claim 13 wherein the condition of the steam includes at least one of a temperature or a pressure of the steam.

20. The system of claim 19 wherein the oil field technology facility includes a boiler configured to heat the steam.

21. The system of claim 20 wherein the boiler is a natural gas fired boiler.

22. The system of claim 13 wherein the first underground volume is at least one of a producing oil field, a depleting oil field, or a depleted oil field.

23. The system of claim 13 wherein the second underground volume is a producing oil field.

24. The system of claim 13 wherein the steam distribution line is a first steam distribution line, and wherein the system further comprises:
   a plurality of solar collectors positioned to heat the first quantity of saturated steam; and
   a second steam distribution line coupled between the solar collectors and the first underground volume to direct the first quantity of saturated steam to the underground storage volume.

* * * * *